United States Patent [19]
Wong et al.

[11] Patent Number: 5,457,776
[45] Date of Patent: Oct. 10, 1995

[54] COMPACT MEMORY FOR MIXED TEXT IN GRAPHICS

[75] Inventors: Harvey H. Wong; Vincent W. Chan, both of Hong Kong, Hong Kong

[73] Assignee: Motorola, Inc., Schaumburg, Ill.

[21] Appl. No.: 942,895

[22] Filed: Sep. 10, 1992

[51] Int. Cl.⁶ .............................. G06T 9/00; G06T 11/60
[52] U.S. Cl. .......................... 395/147; 395/164; 395/166; 345/195; 345/202
[58] Field of Search ..................................... 395/147, 150, 395/151, 164–166; 345/25–28, 98, 127–128, 130, 141–143, 192, 194–195, 202; 382/56; 358/426, 261.4, 443–444, 450, 467, 470

[56] References Cited

U.S. PATENT DOCUMENTS

| | | | |
|---|---|---|---|
| 3,546,681 | 12/1970 | Korn et al. | 340/172.5 |
| 4,751,508 | 6/1988 | Matsushita | 340/750 |
| 4,879,666 | 11/1989 | Kembo | 364/519 |
| 5,086,497 | 2/1992 | Horikawa et al. | 395/147 |
| 5,233,685 | 8/1993 | Landes et al. | 395/147 |
| 5,241,472 | 8/1993 | Gur et al. | 364/413.22 |
| 5,301,315 | 4/1994 | Pellicano | 395/600 |

OTHER PUBLICATIONS

*A Guide to the Tagged Image File Format;* No. 5958–4196; Feb. 14, 1987; Hewlett Packard.
CCIT Recommendation T.4, "Terminal Equipment and Protocols For Telematic Services", 1989, International Telecommunication, Union.

*Primary Examiner*—Heather R. Herndon
*Assistant Examiner*—J. Feild
*Attorney, Agent, or Firm*—Harry A. Wolin; Rennie William Dover; Dan Collopy

[57] ABSTRACT

A fast, highly efficient method for storing computer display information (13) which contains both text and graphics (26, 27). The method separates text (26) from graphics (27) compressing, storing each separately to optimize compression. The method allows use of multiple text fonts (21) on the same display (13) and is simple enough for an 8-bit microcomputer.

10 Claims, 4 Drawing Sheets

COMPACT MEMORY FOR MIXED TEXT IN GRAPHICS

BACKGROUND OF THE INVENTION

The invention relates, in general, to data storage, and more particularly to compact storage of both text and graphics.

Computer displays frequently require both mixed text and graphics on the same screen. When storing information of this type, some form of compression is necessary to conserve memory space. Compression schemes can be highly effective due to the inherent redundancy of the information. For example, large portions of a typical computer display are blank. An example of a compression method which is suited to digital image compression is the "Tagged Image File Format" or "TIFF" described in a document "A GUIDE TO THE TAGGED-IMAGE FILE FORMAT", reference number 5958- 4196, published Feb. 4, 1987 by Hewlett-Packard Company, Greeley, Colo. This method uses a raster scan of the digital image, compressing the individual pixels as a bit-map. The "TIFF" coding method is extremely flexible and is used for images of every conceivable type. Of necessity, however, it is relatively complex and can require a high computing overhead to perform.

There is a need for a simple, and efficient compression scheme which will allow storage of the information on a computer screen and subsequent re-display of that information later while still using a minimum amount of memory. The method should be simple enough to use with an 8-bit microcomputer.

SUMMARY OF THE INVENTION

Briefly stated, there is provided a fast, highly efficient method for storing computer display information which contains both text and graphics. The method separates text from graphics, compressing and storing each separately to optimize compression. A text template stores text editing codes in predetermined cell positions which represent character positions on the display. Font lookup tables which convert the expanded textual codes into a form suited for the display. Multiple font lookup tables provide a variety of display fonts.

DETAILED DESCRIPTION OF THE DRAWINGS

Figure 1:
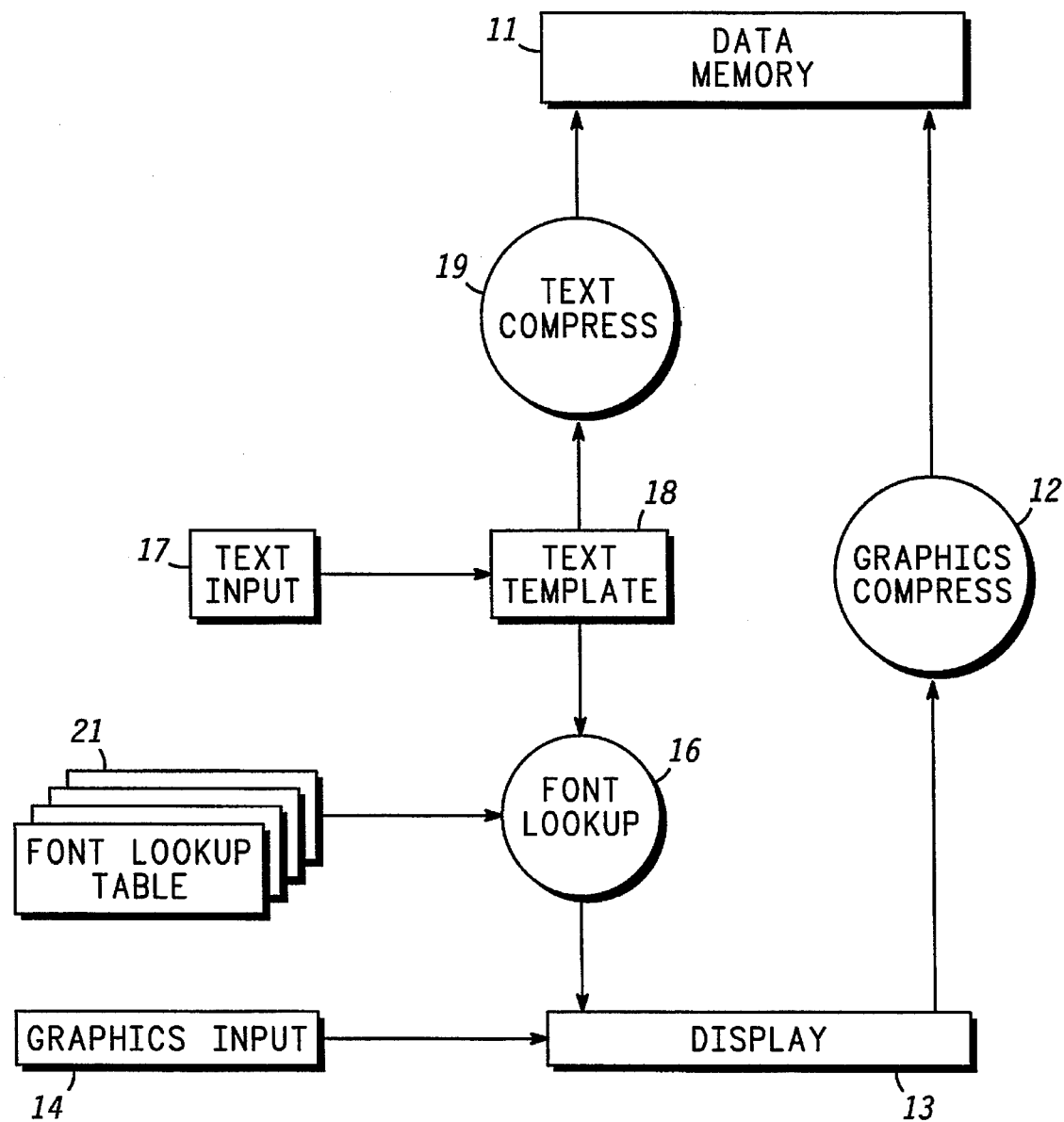
FIG. 1 is a data flow diagram showing a display save process in accordance with the preferred embodiment of the present invention.

FIG. 1 is a data flow diagram showing the display save process of a preferred embodiment in accordance with the present invention. Text information is input through a text input means 17, typically a keyboard or serial link to another computer. The text information is then entered into a text template 18. A text compression process 19 uses methods well known in the art to extract the text information from text template 18 and store the information in a data memory 11. A font look up process 16 extracts the text information from text template 18. Font look-up process 16 uses a font look-up table 21 to determine the graphical bit pattern for each character. Font look up process 16 then causes the corresponding bit pattern to be displayed on a display 13. Display 13 is a computer display means which can simultaneously display both text and graphics such as an LCD matrix display in which each pixel can be controlled by the computer system. Graphical information is input by a graphics input means 14 directly to display 13. Graphics input means 14 is typically a well known device such as a mouse, trackball, or position sensing pen. A graphics compression process 12 causes font look up process 16 to blank the pixels used for the text information. Graphics compression process 12 then scans and compresses the graphical display pattern, storing the compressed graphical information in data memory 11. In the preferred embodiment, graphics compression process 12 uses a one dimensional coding scheme. A suitable one dimensional coding scheme is described in CCITT Recommendation T.4, found in "TERMINAL EQUIPMENT AND PROTOCOLS FOR TELEMATIC SERVICES", pages 23–26, published in 1989 by the International Telecommunications Union. Since any area of the image which was occupied by text is now blank, the remaining information is simplified enhancing both speed and efficiency of graphics compression process 12.

Figure 2:
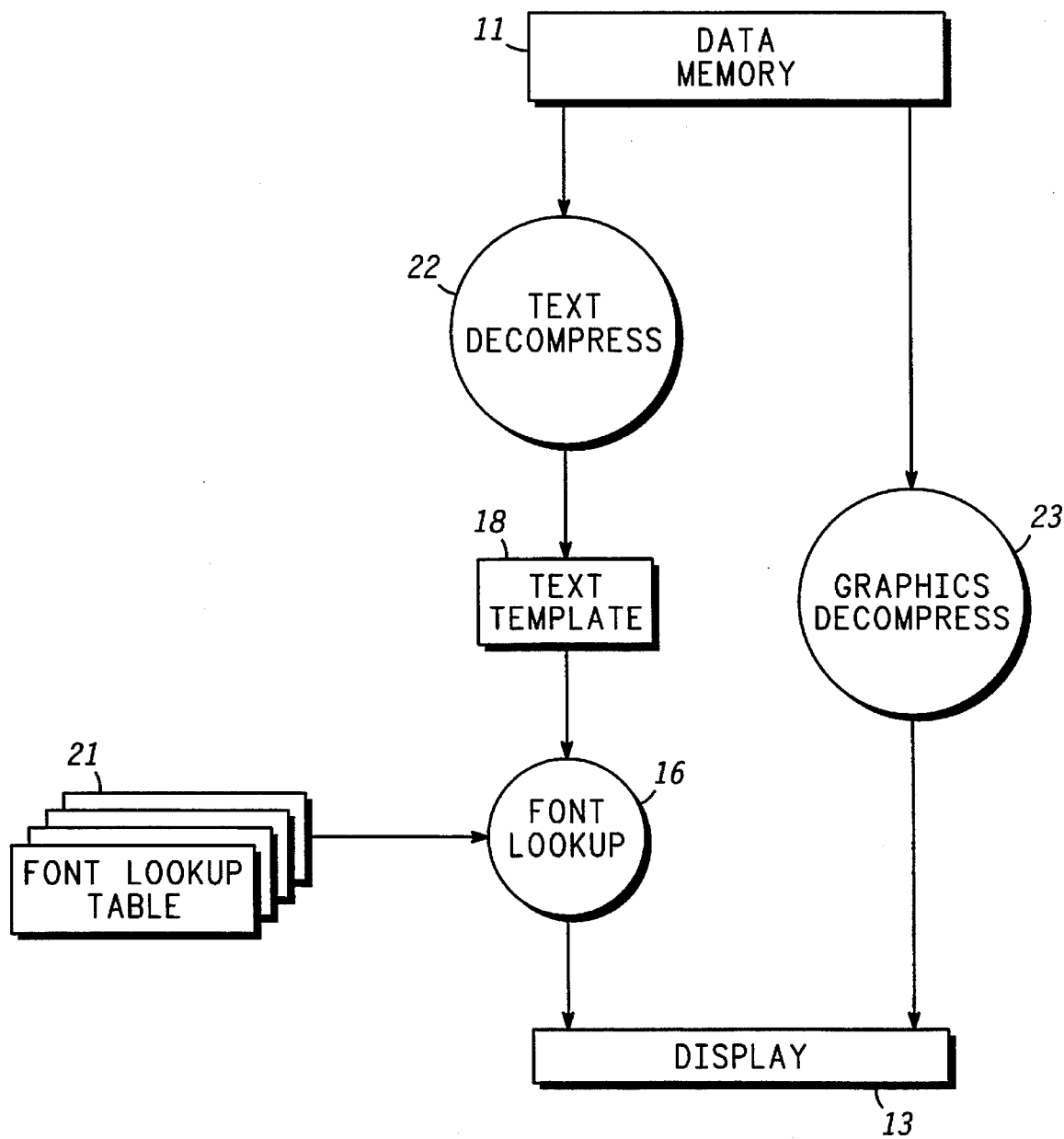
FIG. 2 is a data flow diagram showing a display restore process in accordance with the preferred embodiment of the present invention.

FIG. 2 is a data flow diagram showing the display retrieval process of a preferred embodiment in accordance with the present invention. Graphics information is extracted from data memory 11 by a graphics decompression process 23. In the preferred embodiment, graphics decompression process 23 reverses the one dimensional coding scheme used for graphics compression process 12. Graphics decompression process 23 directly enters the graphics information into display 13. Text information is extracted from data memory 11 by text decompression process 22. The expanded text information is entered into text template 18. Characters from text template 18 are extracted by font look up process 16, converted to a bit pattern and entered on display 13. Font lookup process 16 selects one font lookup table 21 based on font code information as described below. Each font lookup table 21 comprises a pattern of pixels which are used to make up the desired text characters in ways well known in the art. Typically, each character is made up from a pattern of 8 rows each 8 pixels wide, with individual bits within the pixel matrix defining light and dark areas of the character. In the preferred embodiment, two of the tables within font lookup table 21 define large font character formats which use four character positions to define a single large font character.

Alternative embodiments use other combinations of sizes such as using matrices of 1, 4, and 16 character positions to allow three sizes of characters to be displayed. Other embodiments use a basic pixel matrix having differing numbers of pixels. For example a matrix of 5 rows of 7 pixels per row is often used.

Figure 3:
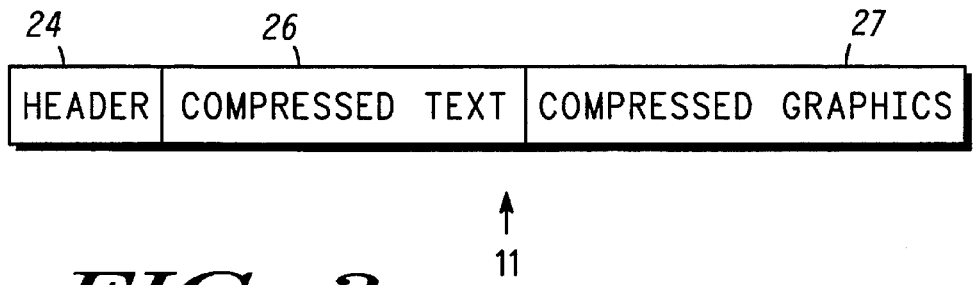
FIG. 3 is a detail diagram showing the data memory portion of FIGS. 1 and 2 in accordance with the preferred embodiment of the present invention.

FIG. 3 is a detailed diagram showing data memory 11 of

FIGS. 1 and 2. Compressed text is saved in a compressed text section 26. Compressed graphics is saved in a compressed graphics section 27. Each section of compressed screen data is located in memory by a screen pointer variable which points to a header 24 located at the start of data memory 11. Header 24 contains information describing whether data memory 11 contains compressed text section 26, compressed graphics section 27 or compressed text section 26 followed by compressed graphics section 27. In the preferred embodiment, header 24 contains pointer variables which point to the start of both compressed text section 26 and compressed graphics section 27. A zero value for a pointer variable indicates that the corresponding section of data memory 11 is not used. Header 24 also contains the version code which was assigned to the hardware and software from which the compressed screen data originated. By knowing the origin of this compressed screen data the information can subsequently be converted to fit a new screen dimension if desired.

Figure 4:
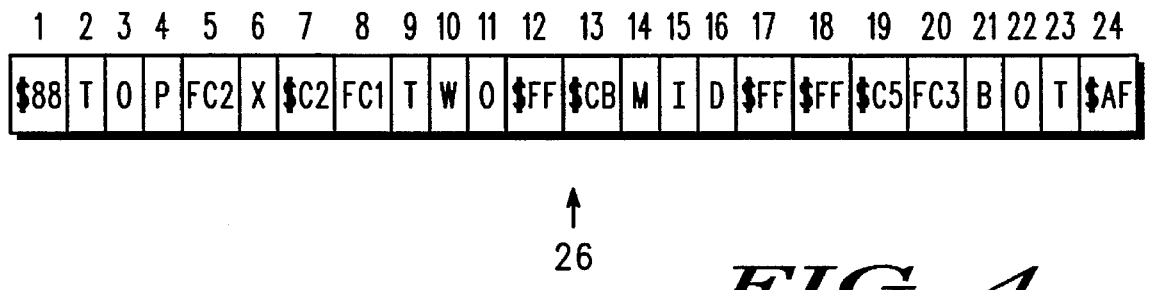
FIG. 4 is a detail diagram showing the compressed text portion of FIG. 3 in accordance with the preferred embodiment of the present invention.

FIG. 4 is a detailed diagram showing an example of compressed text section 26 as shown in FIG. 3. In this example compressed text section 26 uses 24 bytes of computer memory. The example shown in FIG. 4 assumes that the display consists of 40 characters per line with 16 lines. For simplicity the well known convention of signifying a hexadecimal number by prefixing the number with a "$" symbol is used. The heaxadecimal number then specifies the contents of one byte of memory. The compressed text is represented by using the standard seven bit ASCII codes from $04 to $EF. The most significant bit of the byte is used to signify a code word for one or more spaces. If the most significant bit is a one, then the numerical value of the following seven bits specifies the number of spaces. Thus a code $80 represents single space and a code $FF indicates 128 consecutive spaces. When more than 128 consecutive spaces are required multiple codes are used.

Certain codes are reserved from the complete seven bit ASCII character set for font designator codes. In the example shown in FIG. 4 bit codes $00, $01, $02, and $03 are reserved for font codes "FC0", "FC1", "FC2", and "FC3" respectively. Byte 1 contains code $88 which represents the code for nine spaces. Bytes 2–4 contain the ASCII codes for "T", "O", and "P". Byte five contains the code for "FC2" indicating that the following byte, byte number 6, is to be displayed using the third font code. Font codes "FC2", and "FC3" are large size fonts, that is fonts which occupy four character positions in display 13 (FIG. 1). The coding used for compressed text section 26 assumes that the extra three character positions within each large font character are blank. Accordingly byte 24 contains code for 9 spaces in addition to the actual blank spaces which appear on the display 13 (FIG. 1). Alternative embodiments in accordance with the present invention define additional font codes by reserving additional ASCII character codes.

Figure 5:
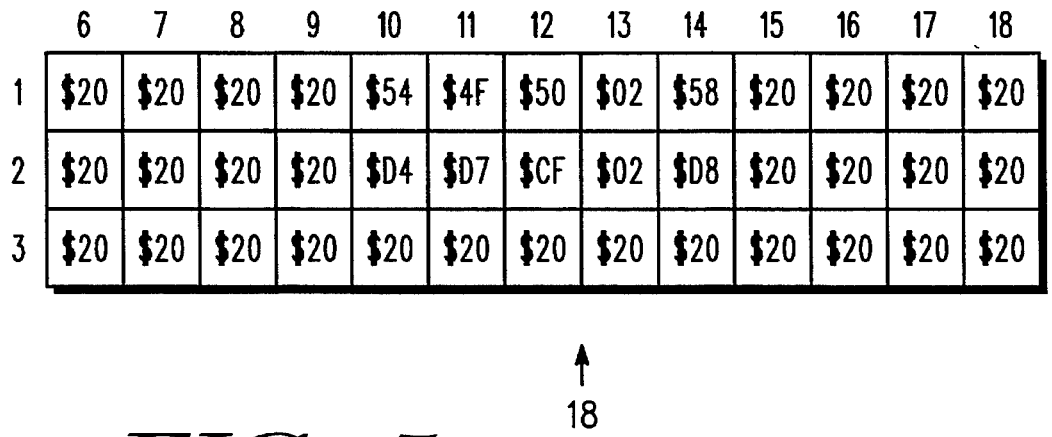
FIG. 5 is a detail diagram showing the text template illustrated in FIGS. 1 and 2 in accordance with the preferred embodiment of the present invention.

FIG. 5 is a detailed diagram showing a portion of text template 18 (FIGS. 1 and 2). Text template 18 is an intermediate storage step for text information after decompression from data memory 11 which serves to facilitate editing. The complete text template 18 is organized as 16 rows of 40 characters, corresponding to the lines and characters per line in the actual display. For clarity only a portion of text template 18 is shown. Thus each memory location within text template 18 stores a data byte which represents the corresponding character on display 13. When first initialized text template 18 is filled with $20 codes representing the ASCII code for spaces.

The example shown in FIG. 5 corresponds to the compressed text example shown in FIG. 4. Accordingly in the first row, bytes 6, 7, 8, and 9 contain $20. This code corresponds to the 9 spaces specified in the first byte of compressed text section 26 (FIG. 4). Byte number 10, row 1 contains $54 corresponding to the ASCII code for "T" likewise bytes 11 and 12, row 1 contain the ASCII code for "O" and "P". Since no font control code precedes bytes number 10, 11, and 12, font control code "FC0" is used by default. Accordingly, the characters "T", "O" and "P" are to be displayed using the first font code. Byte 13, row 1 contains $01 which is font control code "FC2". In the example shown this corresponds to a large font, font number 3, so this character occupies bytes 13 and 14 in both rows 1 and 2. The character to be displayed is stored in byte 14 row 1, $58 corresponding to the ASCII code for "X". Likewise bytes 13 and 14, row 2 contain the value for font code 2 followed by the ASCII code for "X" with the most significant bit set to a one to indicate the second row of a large font character. Accordingly byte 14, row 2 contains the value $D8. Within compressed text section 26 (FIG. 4) bytes 8 to 11 contain the code for "FC1" followed by the ASCII codes for "T", "W", and "O". This indicates that the letters "T", "W", and "O" are to be displayed using a second font. These characters correspond to bytes 10, 11 and 12, row 2 of text template 18. Use of the second font is indicated by setting the most significant bit of these three bytes to a one. Accordingly the values stored in bytes 10, 11, and 12, of row 2 in text template 18 are $D4, $D7, and $CF respectively.

Figure 6:
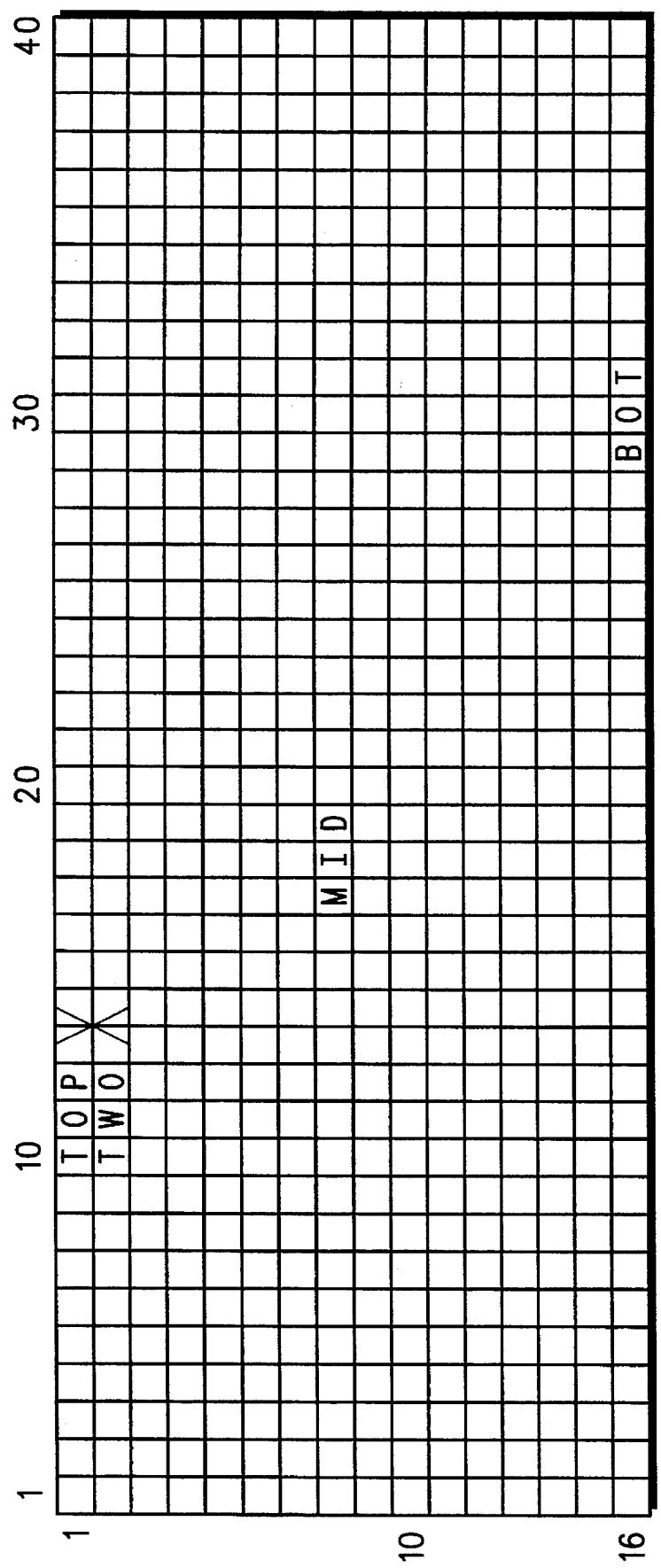
FIG. 6 is a detail diagram showing the computer display portion of FIGS. 1 and 2.

FIG. 6 is a detailed diagram showing display 13 (FIG. 1) with the example of compressed text section 26 (FIG. 4). Line 1 spaces 10, 11 and 12 contain the characters "T", "O", and "P". Lines 1 and 2, characters 13 and 14 contain the half of the character "X". This character is displayed using the large font indicated by the code "FC2". Line 2 characters 10, 11, 12 and are seen to contain the characters "T", "W", and "O" respectively using the italic font indicated by the font code "FC1". Likewise, line 7 characters 18, 19 and 20 are seen to contain the characters "M", "I", and "D" respectively while continuing to using the italic font indicated by the font code "FC1". Character spaces 27 to 32 of both lines 15 and 16 contain the letters "B", "O", "T" using the large italic font indicated by the code "FC3".

By now it should be clear that the present invention provides a fast, highly efficient method for storing computer display information which contains both text and graphics. The method separates text from the graphics, compressing and storing each component separately to optimize speed and efficiency of the compression. The method allows use of multiple text fonts on the same display and is simple enough to be used with an 8-bit microcomputer.

We claim:

1. A compact memory for storing mixed text and graphics for a display means, comprising:

a data memory having stored therein a plurality of bytes which represent a header indicating whether the data memory comprises compressed textual codes and compressed graphical codes, a first plurality of bytes representing compressed textual codes, and a second plurality of bytes representing compressed graphical codes;

graphics compression means coupled to the data memory and the display for generating the compressed graphical codes from graphical display patterns, the graphical display patterns being compatible with format required by the display means, and for generating the graphical display patterns from the compressed graphical codes;

text compression means coupled to the data memory for generating the compressed textual codes from a plurality of expanded textual codes and for generating the plurality of expanded textual codes from the compressed textual codes;

a text template coupled to the text compression means for storing the plurality of expanded textual codes, the text template comprising a plurality of predetermined cell positions representing a corresponding plurality of predetermined character positions on the display means, and wherein the plurality of expanded textual codes are stored in the plurality of predetermined cell positions; and a first font lookup table coupled to the text template and the display means, wherein the plurality of expanded textual codes are converted into a corresponding first text font pattern in a form suited for the display means in response to the first font lookup table.

2. The compact memory of claim 1 further comprising:

font lookup means coupled to the text template and the display means for converting the plurality of expanded textual codes into the corresponding first text font pattern in response to a plurality of predetermined font designator codes, defining predetermined fonts, wherein the font lookup means converts the plurality of expanded textual codes which are to be displayed in response to the first font lookup table when the first of the plurality of font designator codes is present in the expanded textual codes, and the font lookup means converts the plurality of expanded textual codes which are to be displayed in response to a second font lookup table when the first of the plurality of font designator codes is not present in the expanded textual codes.

3. A compact memory for mixed text and graphics, comprising:

a data memory having a plurality of bytes representing a header block, a plurality of bytes representing compressed textual codes, and a plurality of bytes representing compressed graphical codes, and further wherein setting a most significant bit of one of the plurality of bytes of the compressed textual code represents a number of space characters equal to a numerical value defined by the remaining seven bits of the one of the plurality of bytes of the compressed textual code;

display means for displaying a plurality of graphical display patterns and a plurality of textual display patterns;

graphics compression means for converting the compressed graphical codes to and from the corresponding graphical display patterns, the graphical display patterns for presenting on the display means;

text compression means for converting the compressed textual codes to and from expanded textual codes designated from a predetermined set of character codes;

a text template memory which stores text editing codes in a plurality of predetermined cell positions representing a corresponding plurality of predetermined character positions on the display means such that the expanded textual codes are stored in cells corresponding to positions on the display means; and a plurality of font lookup tables which convert the expanded text code into one of a plurality of corresponding font patterns for presentation on the display means, each of the plurality of font lookup tables corresponding to one of a plurality of predetermined font designator codes and each of the plurality of predetermined font designator codes designating a predetermined font, wherein the expanded textual codes which include a first of the plurality of font designator codes are converted and displayed in accordance with the first of the plurality of font lookup tables, and the expanded textual codes which include a second of the plurality of font designator codes are converted and displayed in accordance with a second of the plurality of font lookup tables.

4. A method for mixed text and graphics storage in a memory comprising a data memory containing a plurality of bytes representing a header block followed by a plurality of bytes representing compressed textual codes followed by a plurality of bytes representing compressed graphical codes and display means for displaying both a plurality of graphical display patterns and a plurality of text characters selected from a plurality of text font patterns, the method comprising:

storing text editing codes in a plurality of predetermined cell positions within a text template memory in which each cell position represents a predetermined character position on the display means in such a way that the expanded textual codes are stored in cells which are correctly positioned for the display means;

converting the expanded textual codes to the corresponding compressed textual codes;

converting the expanded textual code stored in the predetermined cell positions to the corresponding text font pattern in a form suited for the display means;

removing the text font pattern from the display means;

converting the graphical display patterns which remain on the display means to the corresponding compressed graphical codes;

converting the compressed textual codes to the corresponding expanded textual codes;

storing text editing codes in a plurality of predetermined cell positions within a text template memory in which each cell position represents a predetermined character position on the display means such that the expanded textual codes are stored in cells which are correctly positioned for the display means;

converting the expanded textual code stored in the predetermined cell positions to the corresponding text font pattern in a form suited for the display means; and converting the compressed graphical codes to the corresponding graphical display patterns into a form suited for the display means.

5. The method for mixed text and graphics storage of claim 4, further comprising:

providing a plurality of text font lookup tables;

initially converting the expanded textual code stored in the predetermined cell positions to the corresponding text font pattern in a form suited for the display means by using a predetermined default text font lookup table;

switching between text font lookup tables when a predetermined font control text code is encountered in the expanded textual code; and continuing to use that text font lookup table until another font control is encountered or until the entire expanded textual code has been converted.

6. The method for mixed text and graphics storage of claim 5, further comprising:

providing a large font lookup table having a large font pattern divided into four large font sub-patterns, such that each large font sub-pattern occupies four cell positions in the text template memory, the four cell positions being a first cell position, a second cell position located to the left of the first cell position, a third cell position located beneath the first cell position, and a fourth cell position located beneath the second cell position;

switching to use the large font lookup table when a predetermined large font control text code is encountered in the expanded textual code;

storing the predetermined large font control text code in the first cell position;

storing the expanded text code in the second cell position;

storing the predetermined large font control text code in the third cell position with the most significant bit set;

storing the expanded text code in the fourth cell position with the most significant bit set; and retrieving the four large font sub-patterns from the large font lookup table in a form and retrieval order suited for the display means.

7. A method for storing text information in a data memory, the data memory including a header section and a compressed text section, wherein the text information is for display on a display, the method comprises the steps of:

a) receiving the text information;

b) storing the text information in a text template, wherein the storage location of the text information in the text template determines the location of the displayed text information on the display;

c) compressing the text information in the text template to produce compressed text information;

d) storing the compressed text information in the text compression section of the data memory, wherein the header section contains a pointer variable which points to the start of the compressed text section for retrieving text information from the data memory to be displayed on the display;

e) determining fonts for the text information in the text template using at least one font look up table, wherein the at least one font look up table correlates the text information with a predetermined bit pattern of the text information; and f) displaying the predetermined bit pattern of the text information on the display.

8. The method of claim 7 wherein step (c) comprises the steps of:

converting a plurality of contiguous blank characters of the text information into a compressed textual code; and storing the compressed textual code in the data memory.

9. The method of claim 7 wherein step (a) comprises the step of receiving the text information in a predetermined format suitable for storage in the text template.

10. The method of claim 7 wherein step (c) comprises the steps of:

for each character of the text information in the text template:

determining at least one font look up table which produces a bit pattern of the character on the display;

determining one of a plurality of predetermined font designator codes affiliated with the at least one font look up table; and storing the one of the plurality of predetermined font designator codes and the text information in the data memory, thereby enabling the character to be retrieved from the data memory and the bit pattern of the character displayed on the display.

* * * * *